United States Patent Office 2,704,249
Patented Mar. 15, 1955

2,704,249

METHOD FOR SEPARATING COMPOSITE ALUMINUM-IRON ARTICLES

Peter Mushovic, Dayton, Ohio, assignor to General Motors Corporation, Detroit, Mich., a corporation of Delaware No Drawing. Application April 10, 1952, Serial No. 281,668

2 Claims. (Cl. 75—63)

This invention relates to a method of separating aluminum and/or its alloys from ferrous supporting members and is particularly directed to a method for removing aluminum overlays from steel backing members, for example.

It is, therefore, the prime object of the invention to provide a method whereby aluminum and/or its alloys may be removed from steel to which it has been bonded for reclaiming the aluminum from scrap parts and the like.

A further object of the invention is to provide a method for reclaiming aluminum from composite aluminum-steel stock wherein the aluminum is removed from the steel without melting the same.

A still further object of the invention is to provide a method whereby the aluminum on steel composite stock may be reclaimed to separate the aluminum from the steel by producing an embrittled interlayer between the aluminum and the steel whereby the aluminum may be removed from the steel by tumbling, vibration or similar expedients and without any melting thereof.

Further objects and advantages of the present invention will be apparent from the following description.

In the past, removal of aluminum and/or its alloys from ferrous metal backing members to which it has been bonded has been a difficult procedure requiring a melting operation. During this operation, the scrap material is heated up to a temperature exceeding the melting point of aluminum or its alloy and this molten material is separated from the solid ferrous material by draining off from a crucible and the like.

This specific procedure of separating aluminum and/or its alloys from ferrous metal backing members has two major drawbacks, first, the ferrous member is always coated with some aluminum material after the separation whereby efficient separation is not accomplished since the quantity of aluminum remaining in combination with the ferrous member varies according to its composition and the temperature involved in the heat treatment, etc. Secondly, aluminum alloys, for example, those containing cadmium or other more or less volatile metals, lose some of said metals through vaporization during the heating step whereby the reclaimed alloy is not of the same composition as the alloy originally used, necessitating return to the mill for further processing in order to bring the alloy back to its original composition. The vaporization of volatile metals may be controlled in some instances if expensive equipment is employed but in the usual process, loss of ingredients is a normal condition. Furthermore, this vaporization of metal presents a health hazard to persons working in the vicinity of the apparatus.

I have discovered a method for removing aluminum from steel or other ferrous alloys wherein the aluminum is removed in the solid state and is not required to pass through the molten phase whereby only minute quantities of aluminum remain attached to the steel and wherein the composition of the reclaimed alloy is substantially identical to the composition of the alloy as it is applied to the steel.

This method consists in the heating of the composite stock under controlled temperature conditions and for a time sufficient to cause production of an embrittled interlayer between the ferrous metal and the aluminum through the formation of a brittle iron-aluminum alloy whereupon the heat treated parts may be tumbled, vibrated or otherwise operated upon to fracture the layer whereupon the aluminum portion falls from the ferrous portion and may be manually or magnetically separated therefrom.

Specifically, aluminum heated above 975° F. for any substantial length of time, tends to form a brittle interlayer with ferrous alloys. This temperature may obviously go up to a temperature approaching but less than the melting point of the particular aluminum alloy being operated upon. Generally, I have found that a heat treatment at a temperature of 1050° F. and above, for periods of about three hours, produce the best results. It is apparent that as the temperature is increased, the time may be reduced and similarly, as the temperature is reduced, the period of heat treatment must be extended.

In this connection, I do not wish to be limited to any specific temperature or time since it is apparent that any temperature, less than the melting point of the aluminum or aluminum alloy, imposed for a time sufficient to produce a brittle iron aluminum interlayer will satisfy the requirements of the process and in this connection, it is apparent also that the thickness of the part, the particular aluminum alloy utilized and the apparatus used for breaking up the interlayer, all regulate, to some extent, the time required for heat treatment at any given temperature.

The heat treatment of the stock to be reclaimed may or may not be carried out in a controlled atmosphere. In this connection, a neutral or reducing atmosphere may be used if the steel is to remain unoxidized and substantially free of scale, etc. The atmosphere has less effect in the condition of the aluminum or aluminum alloy and for these reasons, the use of controlled atmospheres is optional.

After heat treatment, which may be carried out in conventional annealing furnaces or othe suitable type of equipment, the composite material may be tumbled in a tumbling barrel, passed through a hammer mill, violently agitated or dropped a considerable distance through a stack, etc., wherein the shock produced breaks up the brittle aluminum iron interlayer and causes separation from aluminum and/or its alloy from the ferrous metal backing. Bending or flexing of the processed stock will also produce the desired separation.

I have found that substantially pure aluminum, aluminum copper alloys, aluminum copper silicon alloys, aluminum alloys including cadmium, zinc, and in fact any of the commercial aluminum alloys may be separated from a bonded condition with a ferous backing member, such as, iron or steel, by this process.

While the embodiments of the present invention as herein disclosed, constitute preferred forms, it is to be understood that other forms might be adopted.

What is claimed is as follows:

1. In a method for separating composite articles comprising aluminum and/or aluminum alloys bonded to iron and/or its alloys without melting the aluminum, the steps comprising; heating the composite article at a temperature of about 1050° F. for about three hours and sufficient to cause the formation of a brittle iron aluminum alloy layer only at the inter-face, fracturing said brittle inter-face, by tumbling the articles for causing the aluminum to become detached from the iron and then separating the aluminum from the iron.

2. In a method for seprating composite articles comprising an aluminous part consisting of aluminum and/or its alloys and a ferrous portion consisting of iron and/or its alloys wherein the aluminous portion is coextensively bonded to the ferrous portion, the steps comprising; embrittling the inter-face only between the aluminous portion and the ferrous portion by heating the composite article at a temperature in the order of 1050° F. and for a time in the order of three hours and sufficient to cause the formation of a brittle iron-aluminum alloy at the inter-face, tumbling said brittle iron-aluminum alloy for causing the aluminous portion to break away from the ferrous portion, and then magnetically separating the ferrous portion from the aluminous portion.

References Cited in the file of this patent

UNITED STATES PATENTS

| | | |
|---|---|---|
| 952,351 | Phelps | Mar. 15, 1910 |
| 2,223,499 | Schon | Dec. 3, 1940 |
| 2,254,805 | Junker et al. | Sept. 2, 1941 |
| 2,302,981 | Stern | Nov. 24, 1942 |
| 2,544,671 | Grange et al. | Mar. 13, 1951 |